United States Patent [19]

Hsin-hsin

[11] Patent Number: 4,802,381

[45] Date of Patent: Feb. 7, 1989

[54] COMPOUND ACCELERATION-BRAKE PEDAL ASSEMBLY

[76] Inventor: Nsin-Hsin Lo, 9, Alley 3, Lane 35, Weitao Rd. No. Dis., Taichung, Taiwan

[21] Appl. No.: 27,358

[22] Filed: Mar. 18, 1987

[51] Int. Cl.⁴ .......................... G05G 1/14; G05G 1/18
[52] U.S. Cl. ........................................ 74/513; 74/512; 74/564
[58] Field of Search ................ 74/564, 513, 512, 514, 74/560

[56] References Cited

U.S. PATENT DOCUMENTS

| | | | |
|---|---|---|---|
| 1,236,489 | 8/1917 | Sears | 74/564 |
| 1,530,894 | 3/1925 | Hayes | 74/513 |
| 1,583,894 | 5/1926 | Melville | 74/564 |
| 1,801,609 | 4/1931 | Nielsen | 74/564 |
| 2,553,080 | 5/1951 | Ching | 74/564 |
| 2,567,529 | 9/1951 | Schetzer | 74/564 |
| 2,761,329 | 9/1956 | Reed | 74/564 |
| 2,964,970 | 12/1960 | Hiegel et al. | 74/564 |
| 3,380,317 | 4/1968 | Liljequist | 74/513 |
| 3,426,615 | 2/1969 | Strauss | 74/564 |
| 3,487,715 | 1/1970 | Strauss | 74/564 |
| 4,010,982 | 3/1977 | Grossart | 74/512 X |

FOREIGN PATENT DOCUMENTS 0099829  8/1981  Japan ....................... 74/564

*Primary Examiner*—Richard E. Moore
*Assistant Examiner*—Vinh Luong
*Attorney, Agent, or Firm*—Holman & Stern

[57] ABSTRACT

A compound pedal structure providing acceleration and braking action in vehicles. The pedal structure has a pendant-type brake pedal and a pendant-type acceleration pedal which are suspended from a common axle with the brake pedal below the acceleration pedal. A fixed foot stock is positioned between the pedals. By resting a foot on the foot stock a user can selectively operate the pedals by a rocking heel and toe action.

3 Claims, 4 Drawing Sheets

COMPOUND ACCELERATION-BRAKE PEDAL ASSEMBLY

BACKGROUND AND SUMMARY OF THE PRESENT INVENTION

It is conventional, that the accelerator pedal and the brake pedal function as seperate elements in the operation of an automobile or other similar vehicle. Consequently, there is a requirement to frequently shift the user's foot from the accelerator, which provides fuel, to the brake pedal. As is know, in the event of heavy traffic, typically found during daily rush hours in urban environments, the driver of an automobile is required to frequently shift the control foot from the accelerator pedal to the brake pedal and back and forth. This is a nuisance, and in many instances leads to big trouble.

Further drawbacks include the following. Rapid driving of the car at freeway speeds can cause in the event of an emergency-panic brake, the situation whereby the driver must instantly shift the control foot from an acclerator pedal and hit the brake pedal. As is known, the delay, typically cause of the reaction time of the driver, required for realizing the emergency and then shifting the control from an accelerator to the brake pedal will many times lead to a traffic accident.

CHARACTERISTICS OF THE PRESENT INVENTION

The present invention may be broadly characterized as a compound pedal for an acclerator and brake for use in a combustion engine vehicle, which compound pedal includes a foot stock independently and separately set between the nominal accelerator "pedal" and the nominal brake "pedal".

The present invention is characterized by eliminating drawbacks, above-disclosed, with conventional separate acceleratorpedals and brake pedals.

It is an object of the present invention to provide a compound pedal to permit an easy and quick control of accleration and braking.

It is a further object of the present invention to provide a compound pedal whereby the accelerator and/or braking action of an automobile may be easily controlled by the driver's toe or heel, depending on the driver's choice, when the driver places his foot upon the foot stock.

DESCRIPTION OF THE PRESENT INVENTION

Figure 1:
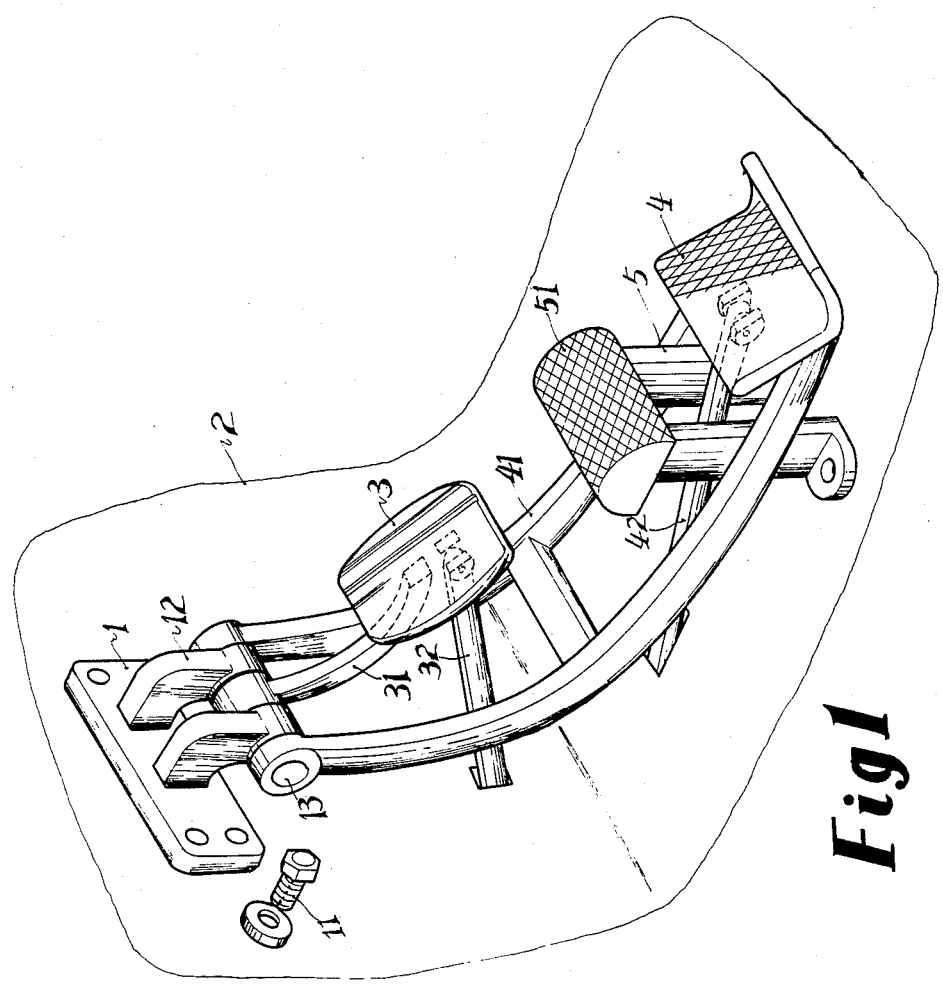
FIG. 1 is a perspective view of the compound accelerator-brake pedal assembly of the present invention.
Figure 2:
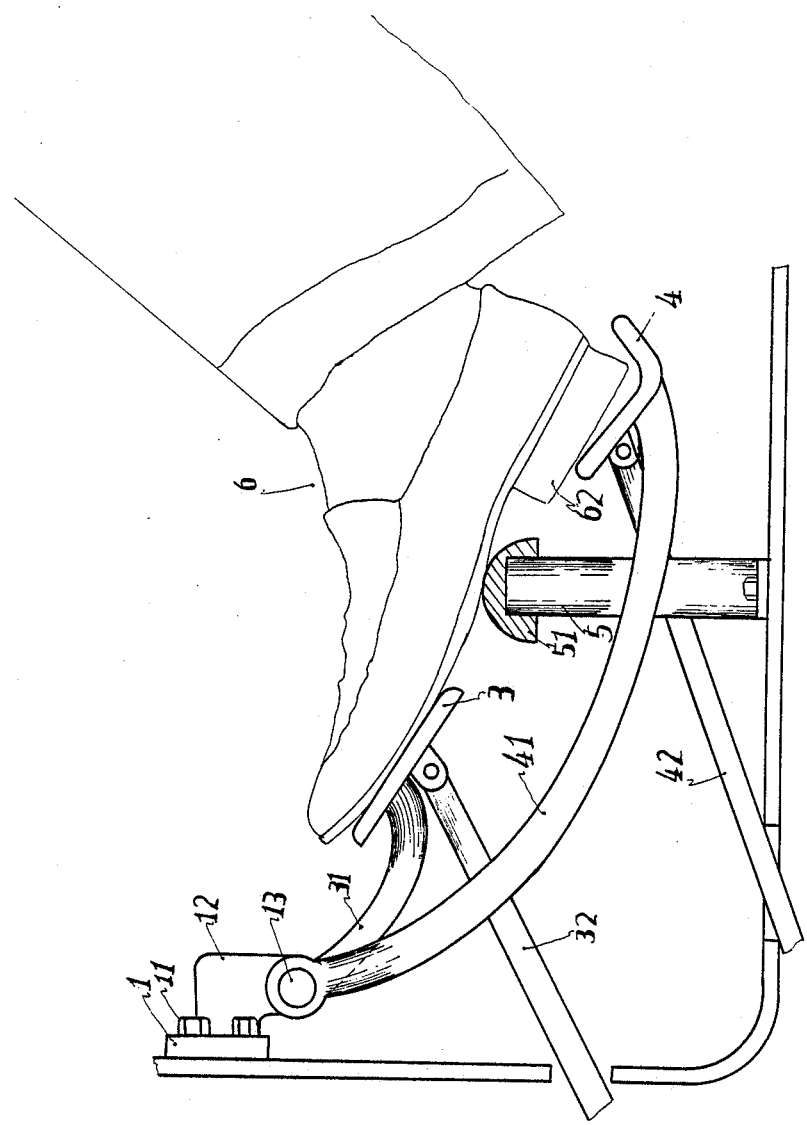
FIG. 2 is a side view of a compound accelerator-brake pedal of the present invention.
Figure 3:
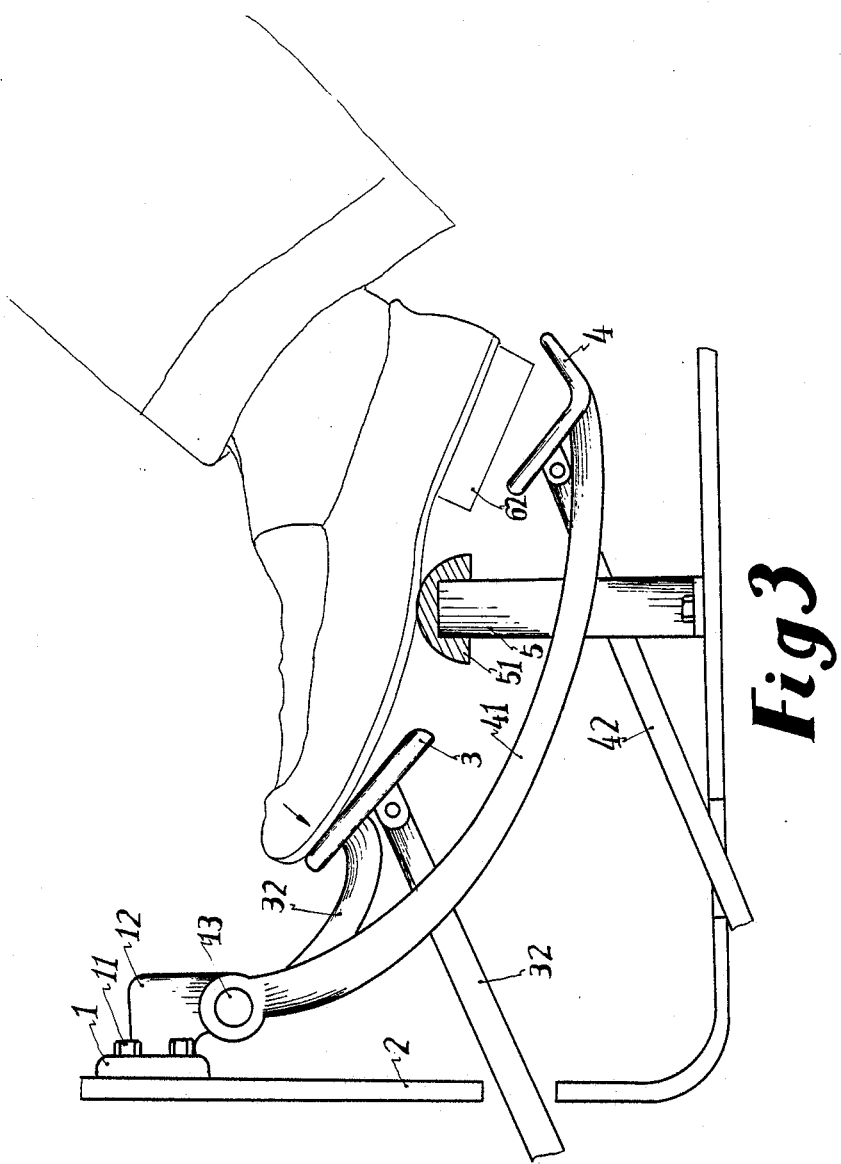
FIG. 3 is an action view of the accelerating operation of the present invention.
Figure 4:
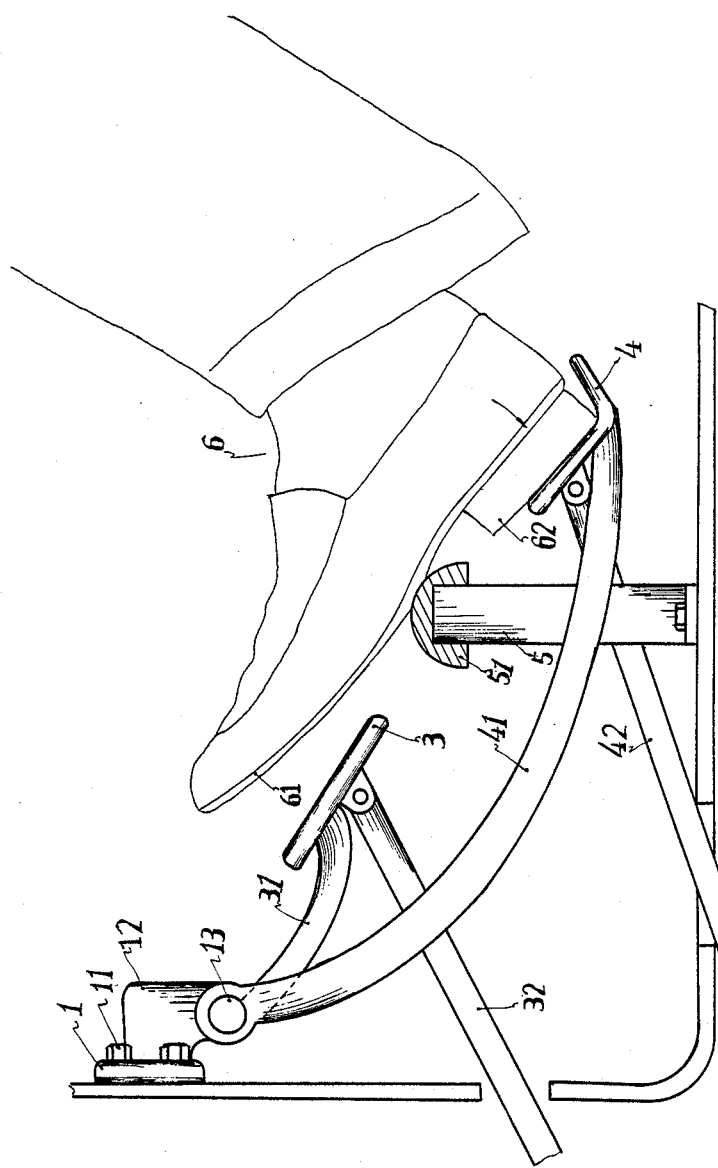
FIG. 4 is an action view of the braking operation of the present invention.

The present invention relates to a compound pedal for an accelerator and brake in an automobile. This compound pedal slopingly and engagingly connects an accelerator pedal means and a braking pedal means with a movable bolt such that a foot stock set between the accelerator means and the braking means enable the driver of the automobile to easilycontrol either the acceleration thereof of the braking thereof.

The invention has, among other things, the following unique advantages:

1. The accelerator pedal and brake pedal are in sloping spaced relationship to each other and a foot stock is independently and separately set between these two pedals. The driver can set his foot on the foot stock. The integral structure of the present invention is in accord with body engineering. A driver may easily set his toe on the accelerator pedal and can rapidly release the accelerator pedal and set his heel on the brake pedal for braking.

2. Since the arch of the driver's foot is supported by the foot stock, the foot stock functions in a manner similar to a seesaw thereby permitting either rapid and convenient fueling with the tiptoe or braking with the heel. In ermergency braking, the driver even can naturally slide his toe to the brake pedal so as to further insure the driver safety.

3. The foot stock of the present invention is designed in the shape of a slope and independently and seperately set between the accelerator pedal and brake pedal. A driver wearing flat-sole shoes, may evenly set his foot on the foot pedal, and a driver wearing high-heel shoes may slightly set his heel rearward when he sets his foot on the pedal so as to very easily contact the accelerator pedal and brake pedal.

4. The heel and toe control is analogous to walking and marching and thus is a "nature" human body movement. Consequently, the driver can easily adapt himself to the present invention. It can be quickly used to provide for the fueling and braking of an automobile.

In connection with the detailed description of a preferred embodiment, reference is made to FIG. 1 through FIG. 4 for ease of reference before presentation of a detailed descriptive discussion, indetification of the reference numerals in the figures is as following:

1. fixing plate
2. vehicle body
3. accelerator pedal
4. brake pedal
5. foot stock
6. foot
11. screw
12. suspending arm
13. movable bolt
31. accelerator pedal arm
32. accelerator rod
41. brake pedal arm
42. brake rod
43. spaced frame supports
51. foot stand
61. shoe
62. heel
63. foot arch The present invention is designed to provide in sloping spaced relationship, the accelerator pedal 3 and brake 4.

As illustrated in FIG. 1, accelerator pedal 3 is attached to an accelerator pedal support arm 31, at the other end of the accelerator pedal support arm 31 is connected with an axle (a movable bolt 13) which is connected in alignment with two brake arms 41 hanging by a suspending arm 12 substantially perpendicular to the fixing plate which is welded firmly to the vehicle body.

Brake pedal arms 41, in a preferred embodiment, are two parallel spaced runner-liner metal elements each having located portions, an upwardly extending arm, and at the other end of each element a brake pedal mounting location. On each upward extending arm there are, respectively, an axis of rotation through which bolt 13 is disposed.

Each brake ame 41 is adjacent to said accelerator pedal arm 31. Thus acclerator pedal arm 31 and accelerator pedal 3 are operatively and movably engaged with brake pedal frame 41. The parallel arms are held in fixed spaced apart relationship by spaced frame supports, cross-braces 43. The accelerator pedal 3 is in the shape of a slope in keeping with the angle of driver's toe stepping thereon, and a foot stock 5 is set separately between the accelerator pedal 3 and brake pedal 4 and with a height between accelerator pedal 3 and brake pedal 4. Therefore, when the driver sets his foot arch on the foot stand 51, he can naturally and easily step on accelerator pedal 3 along the slope of said foot stand so as to push the accelerator rod 32 and to open the accelerator, when the driver has to brake the car, he can loosen his toe and naturally but quickly step on the brake pedal 4 so as to push the brake rod 42 and the brake mechanism of the vehicle. The foot stand rod 5 is welded to the vehicle body and will never hinder the rearward motion of brake bar below the brake pedal 42 so as to achieve the special affect of stepping the accelerator and brake bar. In addition to this, the size of the foot stand 51 can change according to driver's wishes in order to keep comfortable of the drivers foot no matter on flate-sole shoes.

In connection with the aforegoing summary and description of a preferred embodiment applicant has performed information collection and a market survey and determened therefrom that the present invention was deemed popular and deemed as playing a very important role in the field of controlling and braking of an automobile. The result suggested the present invention is a very thoughtful creation.

I claim:

1. A compound acceleration-brake pedal for vehicles consisting essentially of the following engaging and interacting elements: a brake pedal means for initiating braking action, said brake pedal means having parallel upwardly arms, each arm having an upper end with an opening defining an axis of rotation, and a lower end connected to a brake pedal;

an axle means inserted through said opening;

an accelerator pedal assembly rotatably mounted on said axle means and including a pendant-type acceleration pedal;

an accelerator linkage means connected to said accelerator pedal assembly for connecting said pedal assembly to fuel regulating apparatus in the vehicle;

a brake bar means for operatively connecting said brake pedal to a braking mechanism in the vehicle;

a foot stock separately and fixedly disposed between said arms and in spaced relationship between said accelerator pedal, and said brake pedal, said foot stock having a sloping surface being aligned with respective surfaces of said accelerator pedal and said brake pedal.

2. A compound accelerator-brake pedal structure for a vehicle comprising a pendant-type accelerator assembly including a pivot arm and an accelerator pedal, a pendant-type brake assembly including a pivot frame and a brake pedal, the pivot arm and the pivot frame being suspended from a common axle with the accelerator pedal being located above and in line with the brake pedal, and a fixed foot stock between the pedals, the foot stock being positioned for supporting a user's foot in a location for selectively operating the accelerator and brake pedals, with toe pressure and heel pressure respectively by rocking the foot on the foot stock.

3. A structure as defined in claim 2 wherein the pivot frame includes spaced parallel pivot arms which straddle the foot stock and the accelerator assembly.

* * * * *

UNITED STATES PATENT AND TRADEMARK OFFICE
CERTIFICATE OF CORRECTION

PATENT NO. : 4,802,381

DATED : February 7, 1989

INVENTOR(S) : Hsin-Hsin Lo

It is certified that error appears in the above-identified patent and that said Letters Patent is hereby corrected as shown below: Title page:

[76]  Inventor:   Hsin-Hsin Lo, 9, Alley 3, Lane 35,
                  Weitao Rd. N. Dis., Taichung,
                  Taiwan Signed and Sealed this Twenty-fifth Day of July, 1989

Attest:

DONALD J. QUIGG

Attesting Officer

Commissioner of Patents and Trademarks